(12) United States Patent
Sonoda et al.

(10) Patent No.: US 7,873,990 B2
(45) Date of Patent: Jan. 18, 2011

(54) INFORMATION PROCESSING APPARATUS, PROGRAM AND METHOD FOR TRANSMITTING CONTENT IN SECURITY SCHEME ACCORDING TO LICENSE POLICY

(75) Inventors: Toshihiro Sonoda, Kawasaki (JP); Eiji Hasegawa, Kawasaki (JP); Kouichi Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 11/826,973

(22) Filed: Jul. 19, 2007

(65) Prior Publication Data

US 2008/0282316 A1    Nov. 13, 2008

Related U.S. Application Data

(62) Division of application No. 10/282,160, filed on Oct. 29, 2002, now abandoned.

(30) Foreign Application Priority Data

Jun. 27, 2002   (JP)   .............................. 2002-187482

(51) Int. Cl.
     *G06F 17/30*    (2006.01)
(52) U.S. Cl. ................................. 726/10; 726/5; 726/3
(58) Field of Classification Search .................. 726/10, 726/5, 3
     See application file for complete search history.

(56) References Cited

U.S. PATENT DOCUMENTS

| 6,772,176 | B1 | 8/2004 | Saha et al. |
| 2002/0015497 | A1 | 2/2002 | Maruyama et al. |
| 2002/0035723 | A1 | 3/2002 | Inoue et al. |

FOREIGN PATENT DOCUMENTS

| EP | 1120967 A2 | 8/2001 |
| JP | 2001-306737 | 11/1997 |
| JP | 11-341040 | 12/1999 |
| JP | 2001-175757 | 6/2001 |
| JP | 2001-202307 | 7/2001 |

(Continued)

OTHER PUBLICATIONS

Implementation of the DLNA Proxy System for Sharing Home Media Contents; Jung-Tae Kim; Yeon-Joo Oh; Hoon-Ki Lee; Eui-Hyun Paik; Kwang-Roh Park; Consumer Electronics, 2007. ICCE 2007. Digest of Technical Papers. International Conference on ; Publication Year: 2007 , pp. 1-2.*

(Continued)

*Primary Examiner*—David Y Jung
(74) *Attorney, Agent, or Firm*—Staas & Halsey LLP

(57) ABSTRACT

An information processing apparatus is connectable to a user device over a network. The apparatus includes a processor. The processor transmits, in response to reception of a request for a particular item of content, an identification of a security scheme which is applicable to transmission of the particular item of content in accordance with a license policy. When the item of content can be received by the user device in the security scheme, the processor transmits the item of content in the security scheme.

17 Claims, 6 Drawing Sheets

FOREIGN PATENT DOCUMENTS

| | | |
|---|---|---|
| JP | 2001-256162 | 9/2001 |
| JP | 2001-325177 | 11/2001 |
| JP | 2002-051037 A | 2/2002 |
| JP | 2002-163170 A | 6/2002 |

OTHER PUBLICATIONS

A distributed media server management scheme; Sotirchos, S.; Koziris, N.; Papkostantinou, G.; Electrotechnical Conference, 2000. Melecon 2000. 10th Mediterranean; vol. 1; Publication Year: 2000, pp. 6-10 vol. 1.*

Gateway Controlled Content Caching and Retrieval for Cache-and-Forward Networks Lijun Dong; Yanyong Zhang; Raychaudhuri, D.; GLOBECOM Workshops, 2009 IEEE; Publication Year: 2009, pp. 1-6.*

U.S. Appl. No. 10/282,160, filed Oct. 29, 2002, Toshihiro Sonoda, Fujitsu Limited.

Japanese Second Office Action (Decision of Rejection) dated Dec. 19, 2006 and issued in correspondence to Japanese Application No. 2002-187482 (2 pages) (Eng. Translation-2 pages).

* cited by examiner

CONTENT ID

SECURITY SCHEMES

IN ORDER OF PRIORITY

1: ENCRYPTION: DES
    AUTHENTICATION: DIGITAL SIGNATURE
    HASH METHOD: MD-5

2: ENCRYPTION: AES
    AUTHENTICATION: NONE
    HASH METHOD: NONE

3: ENCRYPTION: Triple-DES
    AUTHENTICATION: NONE
    HASH METHOD: NONE

FIG.6

INFORMATION PROCESSING APPARATUS, PROGRAM AND METHOD FOR TRANSMITTING CONTENT IN SECURITY SCHEME ACCORDING TO LICENSE POLICY

CROSS REFERENCE TO RELATED APPLICATION

This application is a divisional of application Ser. No. 10/282,160 filed Oct. 29, 2002 now abandoned.

FIELD OF THE INVENTION

The present invention relates to secure transmission of content, and more particularly to secure delivery of content to a user apparatus in accordance with the license policy of a content provider.

BACKGROUND OF THE INVENTION

Pay digital content, such as audio and video files for example, is transmitted from a server to a client over a network, such as the Internet. In such a case, a client user is first authenticated to the server and the content is then transmitted in accordance with a protocol, such as FTP, HTTP and SSL.

Transmission of content, however, involves such security problems as unauthorized interception, tampering, masquerading, denial of a concluded transaction, redistribution and the like. To prevent such problems, it is proposed that a digital watermark be embedded in the content to restrict its ownership, or that the content be encrypted so that it cannot be replayed without a proper decryption key which can be obtained for value.

However, content encrypted in a particular encryption method can not necessarily be decrypted by any client or electronic apparatus. In addition, the content provider does not always desire to protect all kinds of items of content in the same security scheme. For example, the provider may want to transmit content of higher value in a higher security scheme, and to transmit content of lower value, or content such as advertisement content which is required to be distributed widely, in a lower security scheme without encryption.

In Japanese Unexamined Patent Publication 2001-325177 (A) published on Nov. 22, 2001, Miyazaki discloses a content application server. When the server receives apparatus specification environment information and a request for a content application from a client, the server converts a corresponding source content application to a content application which conforms to the apparatus specification environment information, and supplies the converted content application to the client.

In Japanese Unexamined Patent Publication 2001-202307 (A) published on Jul. 27, 2001, Kawamoto et al. discloses a method of communication between terminals over a network. In this method, one terminal distinguishes a communication application which can be used by another terminal, and transmits information to the other terminal by using that application.

In Japanese Unexamined Patent Publication 2001-175757 (A) published on Jun. 29, 2001, Yamanaka et al. disclose a system for delivering digital content over a network. In this system, a buyer transmits information describing desired content and a transfer condition to a seller. The seller delivers the described content to the buyer in accordance with the transfer condition.

In Japanese Unexamined Patent Publication HEI 11-341040 (A) published on Dec. 10, 1999, Saito et al. disclose a communication apparatus connected between two networks. The communications apparatus collects attribute information from a server on the first network, presents the server's attribute information to a terminal on the second network in accordance with the protocol of the second network, transmits to the server a request for the service selected in accordance with the attribute information, and provides the service from the server to the terminal, if necessary, by converting a format.

In Japanese Unexamined Patent Publication 2001-256162 (A) published on Sep. 21, 2001, Asai et al. discloses a portable terminal which acquires content from a server via a gateway. The content includes a file and an identifier indicating the type of a file, such as video, audio and the like. The terminal transmits the content file to a peripheral device corresponding to an identifier.

The inventors have recognized the need for selection of a security scheme for the transmission of content in accordance with a license policy of a content provider. The inventors have also recognized the need for the transmission or delivery of content from a server to a client in a security scheme available on the client.

An object of the present invention is to provide secure transmission of content to a buyer in accordance with a license policy of a content provider.

Another object of the present invention is to transmit content in an available secure transmission scheme to a user.

SUMMARY OF THE INVENTION

In accordance with an aspect of the present invention, an information processing apparatus is connectable to a user device over a network. The apparatus includes a processor. The processor transmits, in response to reception of a request for a particular item of content, an identification of a security scheme which is applicable to transmission of the particular item of content in accordance with a license policy. When the item of content can be received by the user device in the security scheme, the processor transmits the item of content in the security scheme.

In accordance with a further aspect of the invention, an information processing apparatus is connectable to a user device over a network. The apparatus includes a processor. The processor is adapted to receive a request for a particular item of content from the user device. The processor is adapted to receive an identification of an available security scheme from the user device. When the requested item of content can be transmitted in the security scheme in accordance with a license policy, the processor transmits the requested item of content in the security scheme.

In accordance with a still further aspect of the invention, an information processing apparatus is connectable to a user device over a network. The apparatus includes a processor. The processor is adapted to receive an identification of an available security scheme from the user device. The processor transmits, in response to reception of a request for a content list, a list of items of content that can be transmitted in the available security scheme in accordance with a license policy.

In accordance with a still further aspect of the invention, an information processing apparatus is connectable to a content source over a network. The apparatus includes a processor. The processor transmits a request for a particular item of content. The processor transmits an identification of a security scheme available for reception and reproduction of the particular item of content. The processor receives the particular item of content transmitted in the security scheme in accordance with a license policy.

In accordance with a still further aspect of the invention, an information processing apparatus is connectable to a content source over a network. The apparatus includes a processor. The processor transmits a request for a particular item of content. The processor receives an identification of a security scheme which is applicable to transmission of the particular item of content in accordance with a license policy. When the security scheme is available, the processor transmits the identification of the security scheme.

In accordance with a still further aspect of the invention, an information processing apparatus is connectable to a content source over a network. The apparatus includes a processor. The processor transmits an identification of a security scheme available for reception and reproduction of content. The processor transmits a request for a content list. The processor receives a list of items of content which can be transmitted in the security scheme in accordance with a license policy.

In accordance with a still further aspect of the invention, a program (which may be stored on a storage medium) is for use in an information processing apparatus connectable to a user device over a network. The program is operable to effect the step of transmitting, in response to reception of a request for a particular item of content, an identification of a security scheme which is applicable to transmission of the particular item of content in accordance with a license policy; and the step of transmitting the item of content in the security scheme, when the item of content can be received by the user device in the security scheme.

In accordance with a still further aspect of the invention, a program (which may be stored on a storage medium) is for use in an information processing apparatus connectable to a user device over a network. The program is operable to effect the step of receiving a request for a particular item of content; the step of receiving an identification of an available security scheme; and the step of transmitting the requested item of content in the security scheme, when the requested item of content can be transmitted in the security scheme in accordance with a license policy.

In accordance with a still further aspect of the invention, a method is provided for transmitting an item of content in an information processing apparatus connectable to a user device over a network. The method comprises the step of transmitting, in response to reception of a request for a particular item of content, an identification of a security scheme which is applicable to transmission of the particular item of content in accordance with a license policy; and the step of transmitting the particular item of content in the security scheme, when the particular item of content can be received by the user device in the security scheme.

In accordance with a still further aspect of the invention, a method is provided for transmitting an item of content in an information processing apparatus connectable to a user device over a network. The method comprises the step of receiving, from the user device, a request for a particular item of content; and the step of transmitting the requested particular item of content in the security scheme, when the requested particular item of content can be transmitted in the security scheme in accordance with a license policy.

According to the invention, content can be transmitted in a secure transmission scheme available to a user.

Throughout the drawings, similar symbols and numerals indicate similar items and functions.

BRIEF DESCRIPTION OF THE DRAWINGS

FIG. 6 shows an example of a set of security schemes applicable to a certain item of content and determined in accordance with the license policy.

DESCRIPTION OF THE PREFERRED EMBODIMENTS

Figure 1:
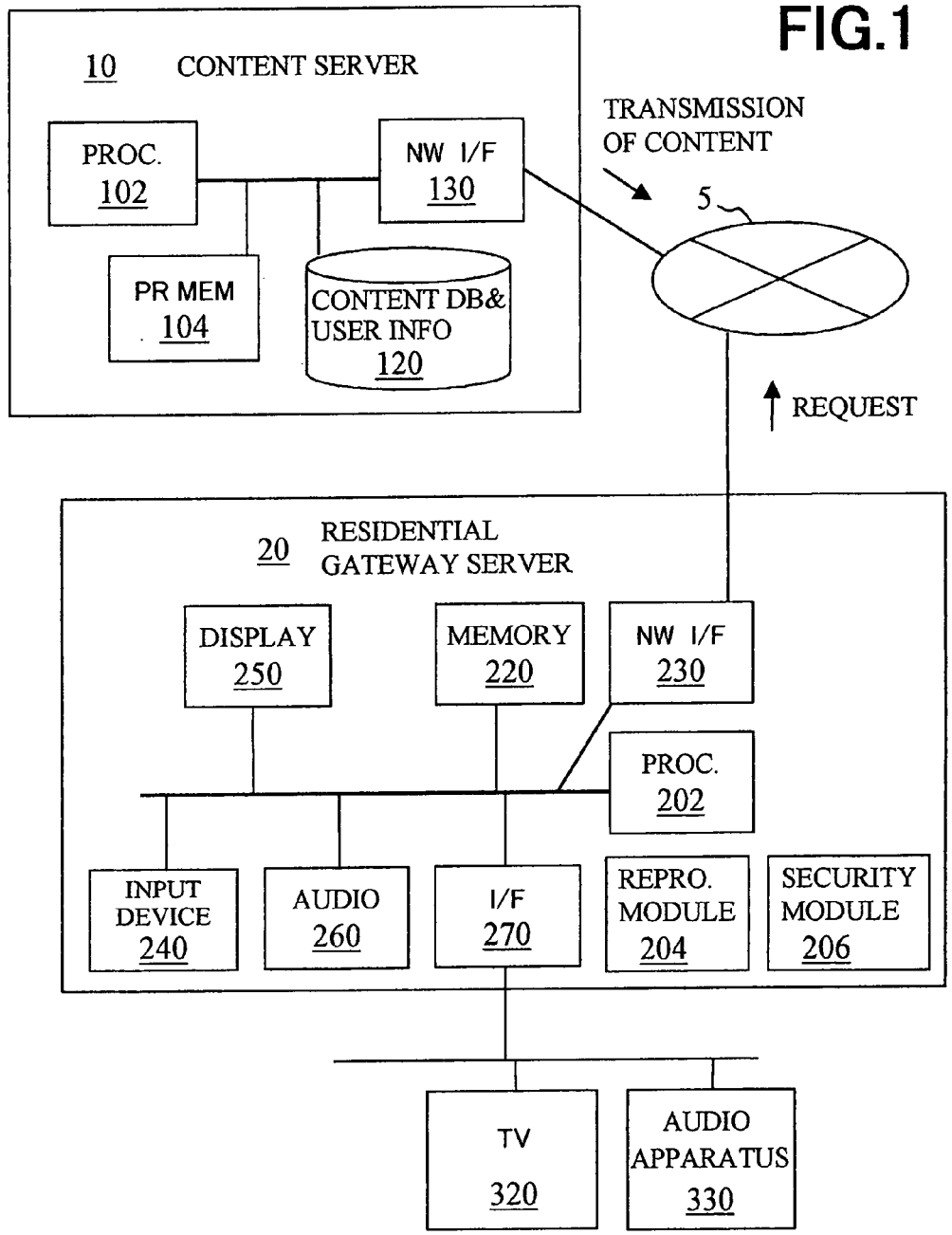
FIG. 1 shows the configuration of a content server and a residential gateway server interconnected via a network, in accordance with an embodiment of the present invention.

FIG. 1 shows the configuration of a content server 10 and a residential gateway server 20 interconnected via a network 5 such as the Internet, in accordance with an embodiment of the present invention. The gateway server 20 is also connected to user devices, such as a television receiver (TV) 320 and an audio apparatus 330.

The content server 10 includes a processor 102 having a CPU, a ROM and a RAM, a program memory or storage device 104, a memory or storage device 120, such as a hard disk unit, for storing a content database, user information and the like, and a network interface (NW I/F) 130 connected to the network 5 such as the Internet, all of which are interconnected via an internal bus.

The storage device 104 stores application programs for the content server 10. The processor 102 operates in accordance with the application programs. Alternatively, such applications may be implemented in the form of hardware, such as an integrated circuit, in the processor 102.

The term "content" herein should be broadly interpreted to include digital content in its narrow sense, such as a motion picture program, a music program, a picture and a dictionary in the form of audio and/or video files or a document file, as well as other copyrighted digital products or software in its broader sense, which is suitable for delivery on the Web, such as an application file. The content may be of the kind which is updated periodically, such as audio and video files of different news, advertisements and weather forecasts, for example. Each item of such content is associated with at least one applicable security scheme for distribution in accordance with the license policy of an administrator of the content server 10, for example in accordance with the type and value of the content, the intended user class, the term of validity of the content, and the like.

FIG. 6 shows an example of a set of security schemes, which are applicable to a certain item of content, and which are determined in accordance with the license policy. Ones of these security schemes may be assigned different priorities, and ones of them may be assigned the same priority. In FIG. 6, for the certain item of content, the first security scheme uses the DES as an encryption method, the digital signature as an authentication method, and the MD-5 as a hash method. The second security scheme uses the AES as an encryption method, but uses neither authentication nor a hash method. The third security scheme uses the triple DES as an encryption method, but uses neither an authentication method nor a hash method. The security scheme may include provisions to restrict the network used for the transmission of an item of content to a network of high security. An advertisement video file, for example, may be transmitted in a lowest security scheme which uses neither an encryption method, an authentication method nor a hash method.

The residential gateway server 20 includes a processor 202 having a CPU, a ROM and a RAM, a content reproducing module 204, a security module 206, a memory or storage device 220, such as a hard disk unit, for storing application programs, a received file and the like, an input device 240 including a keyboard and a mouse, a display device 250, an audio device 260 including a microphone and a speaker, an external network interface (NW I/F) 230, and a device interface (I/F) 270, all of which are interconnected via an internal bus. The device interface 270 is connected to user devices, such as a television receiver (TV) 320 and an audio apparatus 330, via an IEEE 1394 bus or a USB cable.

The memory device 220 stores application programs for the residential gateway server 20. The processor 202 operates in accordance with the application programs. Alternatively, such applications may be implemented in the form of hardware, such as an integrated circuit, in the processor 202.

The reproducing module 204 is used for decoding and reproducing an audio and/or video stream. The reproducing module 204 may perform decryption in accordance with a predetermined encryption method. The security module 206 processes the received content in accordance with a predetermined authentication method, a predetermined hash method, and/or a predetermined encryption method. The reproducing module 204 and the security module 206 are implemented in the form of hardware or software. When they are implemented in software programs, the processor 202 operates in accordance with the programs.

Figure 2:
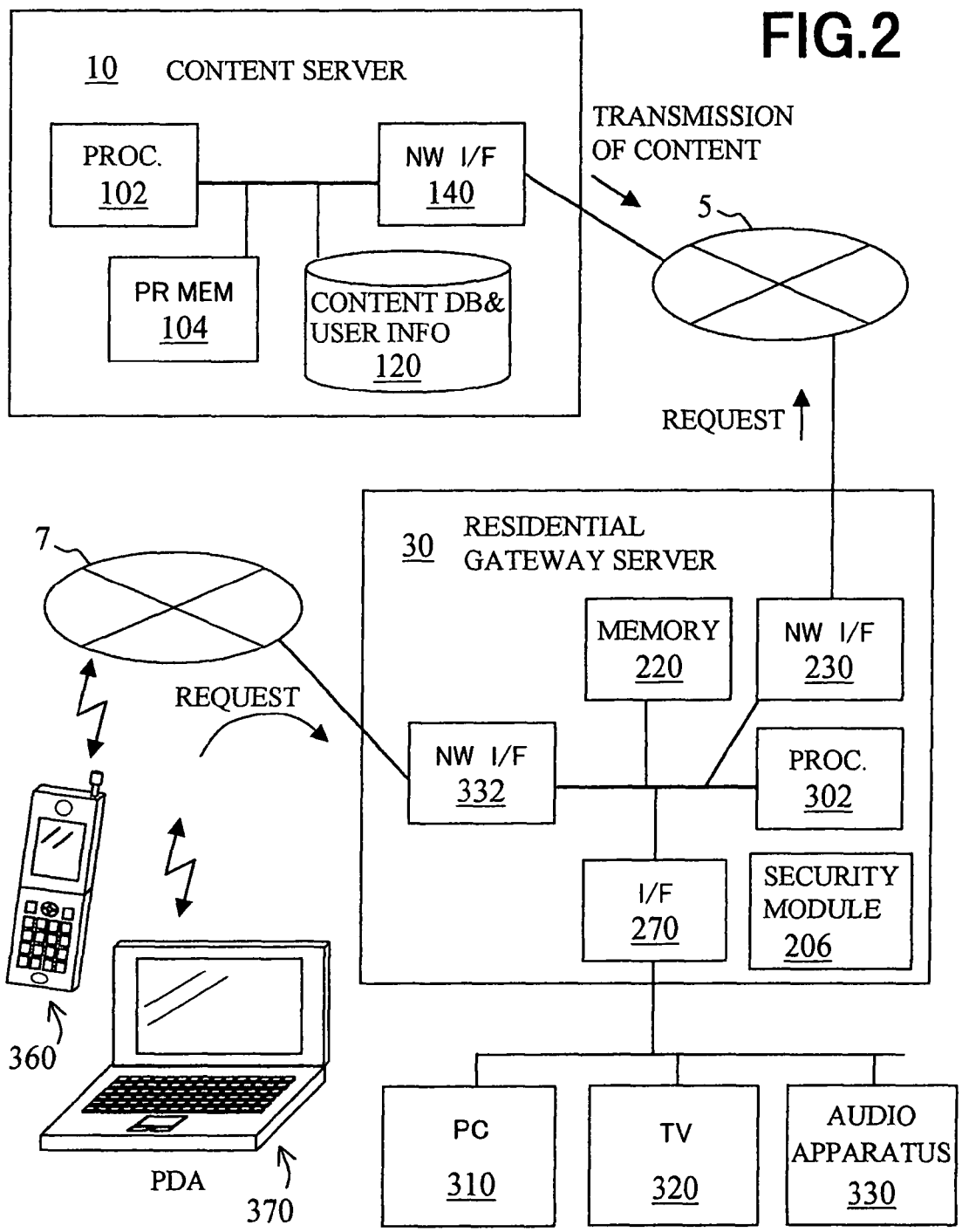
FIG. 2 shows the configuration of the content server and another residential gateway server interconnected via the network, in accordance with another embodiment of the invention.

FIG. 2 shows the configuration of the content server 10 and another residential gateway server 30 interconnected via the network 5 such as the Internet, in accordance with another embodiment of the invention. The gateway server 30 is also connected to user devices, such as a personal computer (PC) 310, the television receiver (TV) 320, and the audio apparatus 330. Further, the gateway server 30 communicates with a mobile telephone 360 and/or a PDA (Personal Digital Assistant) 370 over a network 7, such as a public switched telephone network (PSTN) or a mobile telephone network. The content server 10 has the same configuration as the one shown in FIG. 1, and hence is not described again.

The residential gateway server 30 includes a processor 302 having a CPU, a ROM and a RAM, the security module 206, the memory device 220 such as a hard disk unit, the external network interface (NW I/F) 230, a network interface (NW I/F) 332 connected to the network 7, and the device interface 270, all of which are interconnected via an internal bus.

The memory device 220 stores application programs for the residential gateway server 30. The processor 302 operates in accordance with the application programs. Alternatively, such applications may be implemented in the form of hardware, such as an integrated circuit, in the processor 302.

The device interface 270 is connected to user devices, such as the personal computer (PC) 310, the television receiver (TV) 320, and the audio apparatus 330, via an IEEE 1394 bus or a USB cable. Each of the user devices, including the mobile telephone 360 and the PDA 370 as well as the devices 310, 320 and 330, includes a reproducing module similar to the reproducing module 204 shown in FIG. 1, and each device may further have a security module similar to the security module 206. Preferably, the gateway server 30 collects beforehand the information on the content types, coding methods and security schemes (for example, identifications of encryption schemes) available in the user device, such as the devices 310, 320 and 330, the mobile telephone 360 and the PDA 370, and stores the information in the memory device 220 together with the security schemes (for example, identifications of authentication schemes) available in the gateway server 30. Such information may be entered manually by the user to store in the memory device 220.

Figure 3:
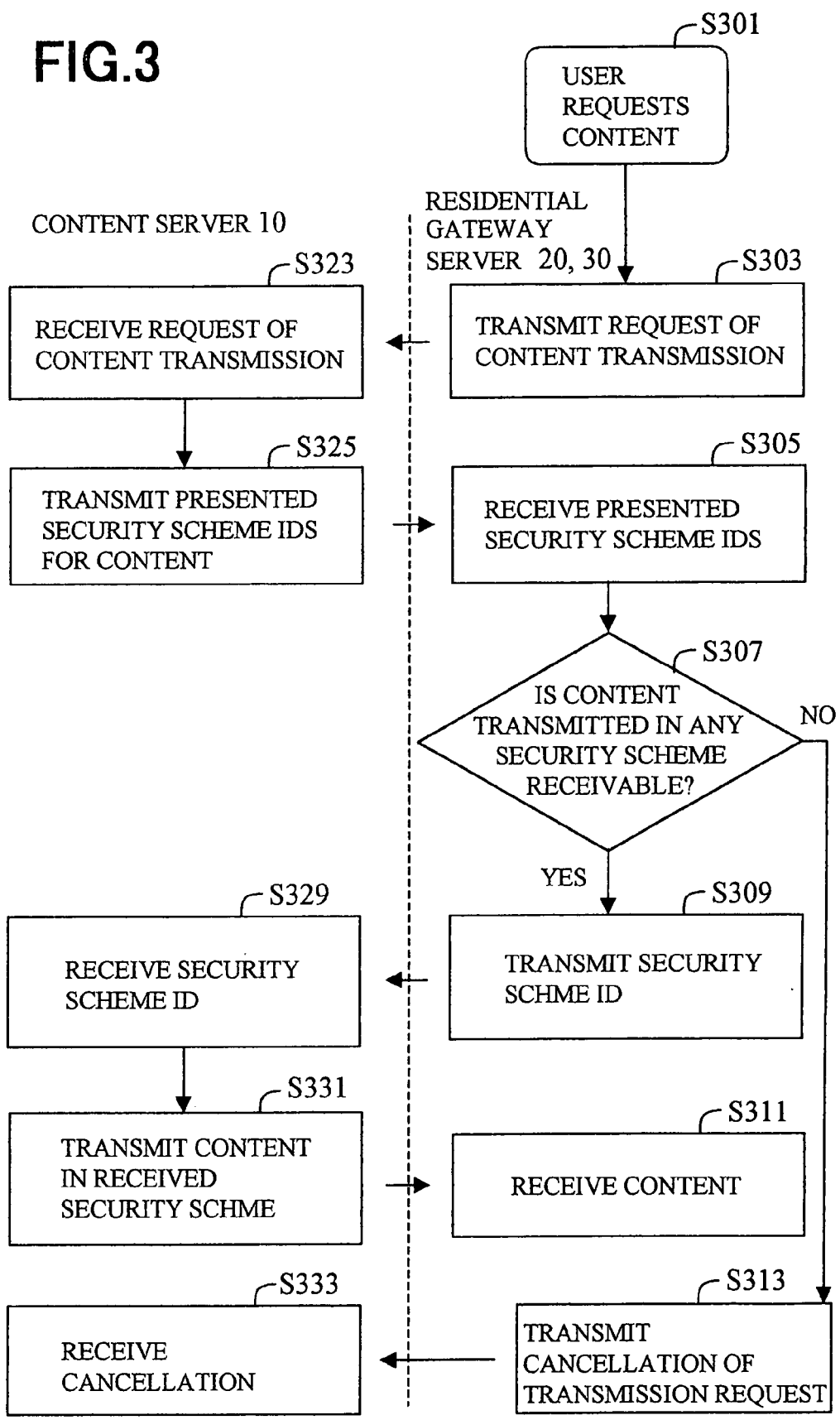
FIG. 3 shows a process for transmitting and receiving the content performed by the content server and the gateway server, in accordance with the invention.

FIG. 3 shows a process for transmitting and receiving the content performed by the content server 10 and the gateway server 20 or 30, in accordance with the invention.

Now, the operations of the content server 10 and the gateway server 20 are described below with reference to FIGS. 1 and 3.

At Step 301, the user operates the input device 240 while viewing the display device 250 of the gateway server 20, to operatively connect the gateway server 20 to the content server 10 over the network 5 and request a desired item of content. The content request may involve purchasing an item of pay content.

At Step 303, in response to the content request, the gateway server 20 (more specifically, the processor 202) requests the content server 10 to transmit the requested item of content. At Step 323, the content server 10 receives the request for transmission of the item of content.

At Step 325, the content server 10 (more specifically, the processor 102) looks up a table of content security schemes in the content database 120, retrieves the identifications (IDs) of the security schemes which are applicable to the transmission of the item of content in accordance with the license policy of the content, and transmits a list of the identifications of the applicable security schemes to the gateway server 20. The applicable security schemes may be the ones as shown in FIG. 6, for example. At Step 305, the gateway server 20 receives the presented list of the identifications of the applicable security schemes.

At Step 307, the gateway server 20 looks up a table of identifications of the security schemes stored in the memory device 220 and available in the gateway server 20 and compares the presented security schemes with the available security schemes to determine whether the item of content to be transmitted in any ones of the presented security schemes can be received, decoded and reproduced. The security schemes available in the gateway server 20 mean the ones which are available in the reproducing module 204 and the security module 206 of the gateway server 20, and may include the security schemes which can be available in the user devices 320 and 330 connected to the gateway server 20 or other user devices (not shown) not connected to the gateway server 20.

If it is determined that the item of content can be received, decoded and reproduced, then the gateway server 20 at Step 309 selects or designates a security scheme of the highest priority from among the applicable security schemes that match with the available security schemes, and transmits an identification of the selected security scheme to the server 10. At Step 329, the content server 10 receives the identification of the selected security scheme.

At Step 331, the content server 10 retrieves the requested item of content from the database 120, processes the item of content in accordance with the selected security scheme, and transmits the thus processed item of content to the gateway server 20 in accordance with the selected security scheme. Such an item of content may be processed beforehand in accordance with parts of the applicable security schemes and stored in the database 120. At Step 311, the gateway server 20 receives the item of content, stores it in the memory device 220, and produces a display on the display device 250 indicating that the item of content has been received. The item of content thus becomes ready for use by the user.

If it is determined at Step 307 that the item of content cannot be received, then the gateway server 20 at Step 313 sends a request for canceling the content transmission request to the server 10, and produces a display on the display device 250 indicating that the requested item of content is not available. At Step 333, the server 10 receives the request for canceling the content transmission request, and the procedure exits the routine for content transmission of FIG. 3.

Figure 4:
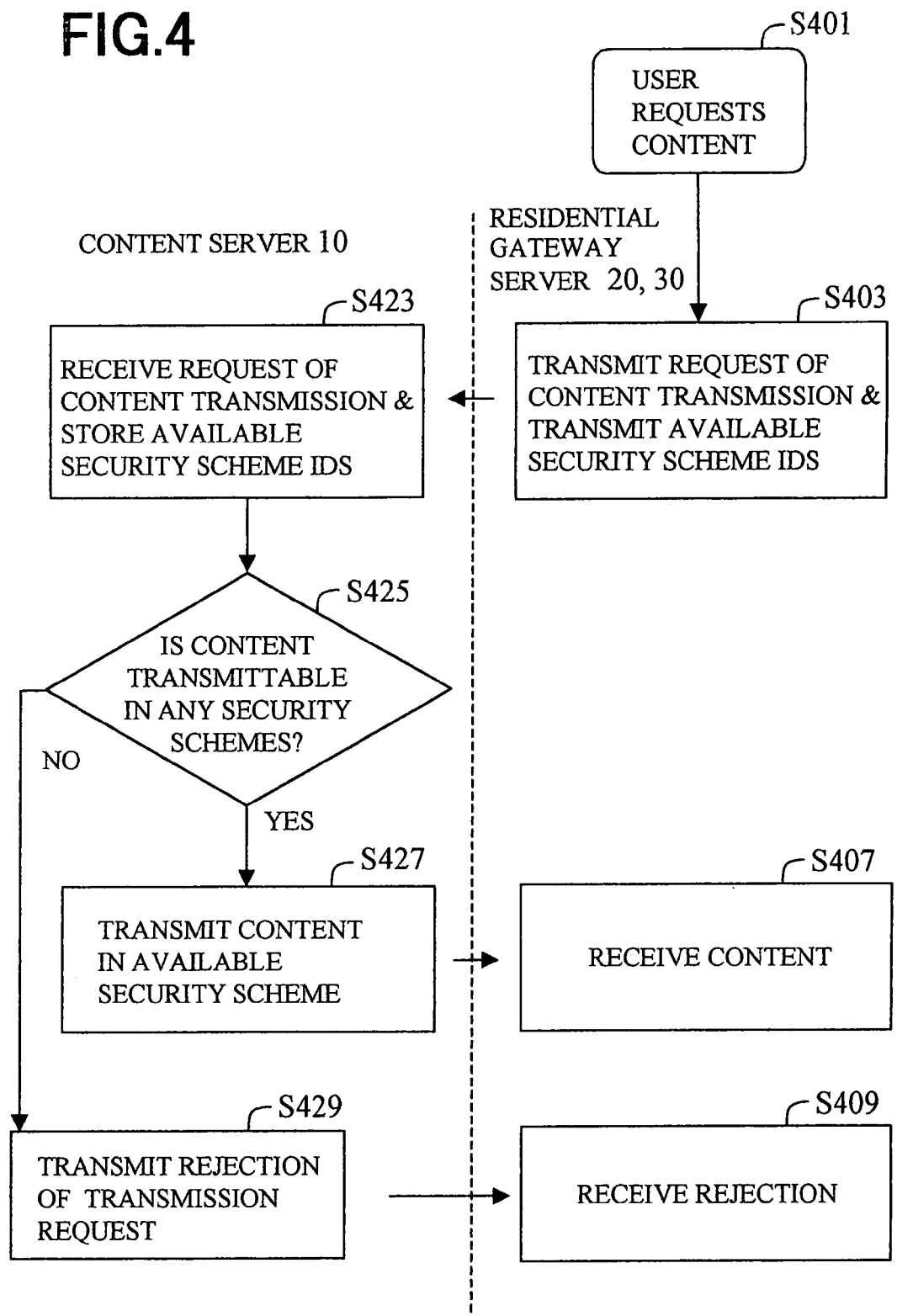
FIG. 4 shows another process for transmitting and receiving the content performed by the content server and the gateway server, in accordance with the invention.

FIG. 4 shows another process for transmitting and receiving the content performed by the content server 10 and the gateway server 20 or 30, in accordance with the invention.

Now, the operations of the content server 10 and the gateway server 20 are described below with reference to FIGS. 1 and 4.

At Step 401, the user operates the input device 240, while viewing the display device 250 of the gateway server 20, to operatively connect the gateway server 20 to the content server 10 over the network 5 and request a desired item of content.

At Step 403, in response to the content request, the gateway server 20 (more specifically, the processor 202) requests the content server 10 to transmit the requested item of content, looks up the table of the identifications of the security schemes stored in the memory device 220 and available in the gateway server 20, and transmits the identifications of the available security schemes. At Step 423, the content server 10 (more specifically, the processor 102) receives the request for transmission of the item of content together with the identifications of the available security schemes.

At Step 425, the content server 10 compares the security schemes available in the gateway server 20 with the security schemes stored in a memory device 120 of the content server 10 and applicable to the requested item of content, and determines whether the requested item of content can be transmitted in any ones of the available security schemes.

If it is determined that the item of content can be transmitted in any ones of the available security schemes, then the content server 10 at Step 427 selects a security scheme of the highest priority from among the applicable security schemes that match the available security schemes, retrieves the requested item of content from the database 120, processes the item of content in accordance with the selected security scheme, and transmits the thus processed item of content to the gateway server 20 in accordance with the selected security scheme. Such an item of content may be processed beforehand in accordance with parts of the applicable security schemes and stored in the database 120. The gateway server 20 receives the item of content at Step 407.

If it is determined that the item of content cannot be transmitted in any one of the available security schemes, then the gateway server 20 at Step 429 sends a notification of rejecting content transmission to the gateway server 20. At Step 409, the server 10 receives the notification of rejecting content transmission, and produces a display on the display device 250 indicating that the requested item of content is not available.

Figure 5:
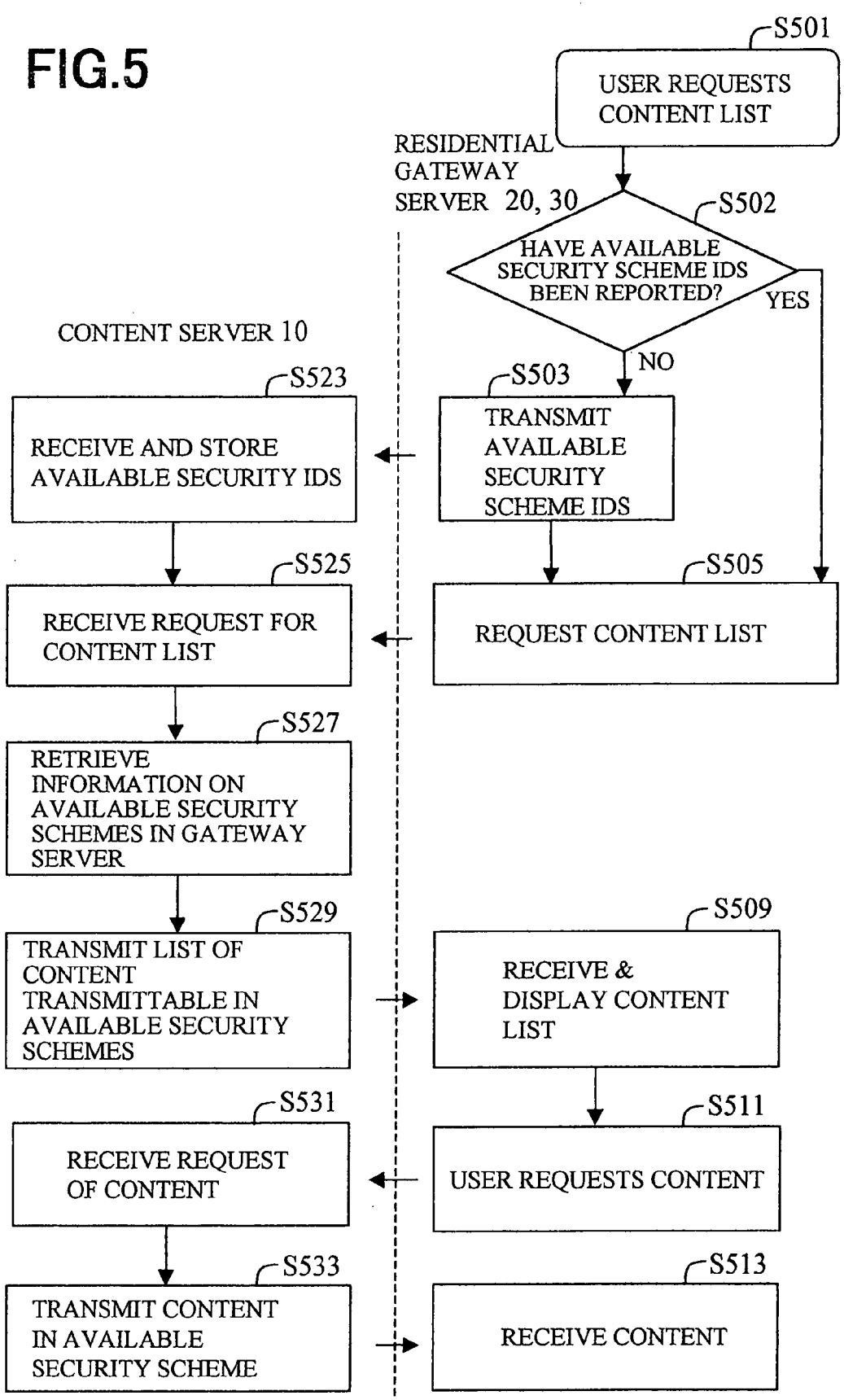
FIG. 5 shows a further process for transmitting and receiving the content performed by the content server and the gateway server, in accordance with the invention.

FIG. 5 shows a further process for transmitting and receiving the content performed by the content server 10 and the gateway server 20 or 30, in accordance with the invention.

Now, the operations of the content server 10 and the gateway server 20 are described below with reference to FIGS. 1 and 5.

At Step 501, the user operates the input device 240, while viewing the display device 250 of the gateway server 20, to operatively connect the gateway server 20 to the content server 10 over the network 5 and request a list of available items of content from the gateway server 20.

At Step 502, the gateway server 20 (more specifically, the processor 202) determines whether the identifications of the security schemes available in the gateway server 20 for the type of content have already been reported to the content server 10. For this purpose, the gateway server 20 may send, to the content server 10, a query as to whether the identifications of the available security schemes have already been reported. If it is determined that they have already been reported, then the gateway server 20 at Step 505 requests transmission of a list of available items of content. On the other hand, if it is determined that they have not been reported yet, then the gateway server 20 at Step 503 retrieves the identifications of the available security schemes stored in the memory device 220, transmits the identifications to the content server 10 and, at Step 505, requests transmission of a list of available items of content.

At Step 523, the content server 10 (more specifically, the processor 102) receives the identifications of the available security schemes, and stores them as user information in the memory device 120. The content server 10, at Step 525, receives the request for transmission of a content list, and, at Step 527, retrieves the identifications of the security schemes available in the gateway server 20 from the memory device 120.

At Step 529, the content server 10 compares the security schemes available in the gateway server 20 with the security schemes and applicable to items of content which can be provided by the content server 10, produces a list of available items of content which can be transmitted in the available security schemes, and transmits the list to the gateway server 20. The list may include attributes of each item of content, such as a type of content (for example, identification of the type, such as an audio and/or video file, a text file, and the like), a title or identification of an item of content, license policy, a price, and the term of validity.

At Step 509, the gateway server 20 displays the content list on the display device 250. At Step 511, the user operates the input device 240, while viewing the display device 250 of the gateway server 20, selects one or more items of content and requests the selected one or more items of content. In response to the request, the gateway server 20 requests the content server 10 to transmit the selected one or more items of content.

At Step 531, the content server 10 receives the request for content transmission, selects a security scheme of the highest priority from among the applicable security schemes that match the available security schemes for each item of content, retrieves the requested each item of content from the database 120, processes each item of content in accordance with the selected security scheme, and transmits the thus processed one or more items of content to the gateway server 20 in accordance with the respective selected security schemes. Such items of content may be processed beforehand in accordance with parts of the applicable security schemes and stored in the database 120. At Step 513, the gateway server 20 receives the one or more items of content and stores them in the memory device 220. The items of content thus become ready for use by the user.

Now, the operations of the content server 10 and the gateway server 30 are described below with reference to FIGS. 2 and 3.

At Step 301, the user operates the keys on the mobile telephone 360 or the PDA 370 while viewing the display thereof, to connect the mobile telephone 360 or the PDA 370 to the gateway server 30 over the network 7, and requests a desired item of content from the gateway server 30. In this case, when the item of content is to be used on the mobile telephone 360 or the PDA 370, the mobile telephone 360 or the PDA 370 may also transmit, to the gateway server 30, the identifications of the security schemes available in the mobile telephone 360 or the PDA 370. The gateway server 30 then stores the identifications of the available security schemes in the memory device 220. The content request may involve purchasing an item of pay content.

The operations of the content server 10 and the gateway server 30 at Steps 303 to 305 and Steps 323 to 325 are the same as those of the content server 10 and the gateway server 20 shown in FIG. 1, and hence are not described again.

At Step 307, the gateway server 30 (more specifically, the processor 302) looks up a table of the identifications of the security schemes stored in the memory device 220 and available for a combination of the gateway server 30 and the user devices 310, 320, 330, 360 and 370, compares the available security schemes with the security schemes presented by the content server 10, and determines whether the item of content to be transmitted in any ones of the presented security schemes can be received, decoded and reproduced.

The operations of the content server 10 and the gateway server 30 at Steps 309 and 329 to 333 are the same as those of the content server 10 and the gateway server 20 shown in FIG. 1, and hence are not described again.

At Step 311, the gateway server 30 receives the item of content transmitted in the selected security scheme, stores the received item of content in the memory device 220, and sends a notification of the reception of the item of content to the mobile telephone 360 or the PDA 370 for display. On the other hand, at Step 313, the gateway server 30 transmits a request for canceling the content transmission request to the server 10 and, at the same time, sends the notification of the cancellation to the mobile telephone 360 or the PDA 370 for display.

Now, the operations of the content server 10 and the gateway server 30 are described below with reference to FIGS. 2 and 4.

At Step 401, the user operates the keys on the mobile telephone 360 or the PDA 370 while viewing the display thereof, to connect the mobile telephone 360 or the PDA 370 to the gateway server 30 over the network 7, and requests a desired item of content from the gateway server 30. In this case, when the item of content is to be used on the mobile telephone 360 or the PDA 370, the mobile telephone 360 or the PDA 370 may also transmit, to the gateway server 30, the identifications of the security schemes available in the mobile telephone 360 or the PDA 370. The gateway server 30 then stores the identifications of the available security schemes in the memory device 220.

At Step 403, in response to the content request received from the user, the gateway server 30 (more specifically, the processor 302) requests the content server 10 to transmit the item of content and, at the same time, looks up a table of the identifications of the security schemes stored in the memory device 220 and available for a combination of the gateway server 30 and the user devices 310, 320, 330, 360 and 370, and transmits the identifications of the available security schemes to the content server 10.

The operations of the content server 10 and the gateway server 30 at Steps 423 to 429 are the same as those of the content server 10 and the gateway server 20 shown in FIG. 1, and hence are not described again.

At Step 407, the gateway server 30 receives the item of content, stores the received item of content in the memory device 220, and sends a notification of the reception of the item of content to the mobile telephone 360 or the PDA 370 for display. On the other hand, at Step 409, the gateway server 30 receives, from the server 10, a notification of rejecting the content transmission request, and passes the notification to the mobile telephone 360 or the PDA 370 for display.

Now, the operations of the content server 10 and the gateway server 30 are described below with reference to FIGS. 2 and 5.

At Step 501, the user operates the keys on the mobile telephone 360 or the PDA 370 while viewing the display thereof, connects the mobile telephone 360 or the PDA 370 to the gateway server 30 over the network 7, and requests a list of items of content from the gateway server 30. In this case, the mobile telephone 360 or the PDA 370 may also transmit, to the gateway server 30, the identifications of the security schemes available in the mobile telephone 360 or the PDA 370. The gateway server 30 then stores the identifications of the available security schemes in the memory device 220.

At Step 502, in response to the request, the gateway server 30 (more specifically, the processor 302) determines whether the identifications of the security schemes stored in the memory device 220 and available for a combination of the gateway server 30 and the user devices 310, 320, 330, 360 and 370 have already been reported to the content server 10. For this purpose, the gateway server 30 may send a query as to whether the identifications of the available security schemes have already been reported to the content server 10. If it is determined that they have already been reported, then the gateway server 30 at Step 505 requests the content server 10 to transmit a list of available items of content. On the other hand, if it is determined that they have not been reported yet, then at Step 503 the gateway server 30 transmits the identifications of the available security schemes to the content server 10 and, at Step 505, requests the transmission of a list of available items of content.

The operations of the content server 10 and the gateway server 30 at Steps 523 to 533 are the same as those of the content server 10 and the gateway server 20 shown in FIG. 1, and hence are not described again.

At Step 509, the gateway server 30 transmits the content list to the mobile telephone 360 or the PDA 370 for display on its display device. At Step 511, the user operates the keys on the mobile telephone 360 or the PDA 370 while viewing the list of available items of content, selects one or more items of content, and requests the selected one or more items of content from the gateway server 30. In response to the request, the gateway server 30 requests the content server 10 to transmit the selected one or more items of content.

At Step 513, the gateway server 30 receives the items of content, stores the received items of content in the memory device 220, and sends a notification of the reception of the items of content to the mobile telephone 360 or the PDA 370 for display.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information processing apparatus connectable to a user device over a network, said information processing apparatus comprising a controller to control said information processing apparatus according to a process, comprising:

transmitting, in response to reception of at least one identification of at least one available security scheme and of a request for a content list from said user device, a list of items of content that can be transmitted in said at least one security scheme in accordance with a license policy, and that can be received by said user device and reproduced in said at least one security scheme, and transmitting, in response to a request for an item of content selected from said list of items of content, the selected item of content in an applicable one of said at least one security scheme.

2. The information processing apparatus according to claim 1, said process further comprising:

receiving cancellation of said request for the item of content.

3. An information processing apparatus connectable to a user device over a network, said information processing apparatus comprising a processor, wherein:

said processor is adapted to receive at least one identification of at least one available security scheme from said user device and receive a request for a content list from said user device, said processor transmits, in response to reception of the request for a content list, a list of items of content that can be transmitted in said at least one security scheme in accordance with a license policy, and in response to a request for an item of content selected from said list of items of content, said processor transmits the selected item of content in an applicable one of said at least one available security scheme.

4. The information processing apparatus according to claim 3, wherein when the requested item of content cannot be transmitted in any of said at least one security scheme in accordance with said license policy, said processor does not transmit the requested item of content.

5. An information processing apparatus connectable to a content source over a network, said information processing apparatus comprising a processor, wherein:

said processor transmits at least one identification of at least one security scheme available for reception and reproduction of content and transmits a request for a content list, said processor receives, in response to the request for a content list, a list of items of content which can be transmitted in said at least one security scheme in accordance with a license policy, and said processor transmits a request for an item of content selected from said content list.

6. The information processing apparatus according to claim 5, wherein said processor transmits said request for the selected item of content, in response to a request for the selected item of content received from another apparatus.

7. An information processing apparatus connectable to a content source over a network, said information processing apparatus comprising a controller to control the information processing apparatus according to a process, comprising:

transmitting at least one identification of at least one security scheme available for reception and reproduction of content and transmitting a request for a content list receiving, in response to the request for a content list, a list of items of content which can be transmitted in said one security scheme in accordance with a license policy, and transmitting a request for an item of content selected from said list of items of content.

8. The information processing apparatus according to claim 7, said process further comprising transmitting the request for an item of content selected from said content list, in response to a request for the selected item of content received from another information processing apparatus.

9. A computer-readable medium storing a program for an information processing apparatus connectable to a user device over a network, said program causing a computer to execute:

transmitting, in response to reception of at least one identification of at least one available security scheme and of a request for a content list from said user device, a list of items of content that can be transmitted in said at least one security scheme in accordance with a license policy and that can be received by said user device and reproduced in said at least one security scheme; and transmitting, in response to a request for a item of content selected from said list of items of content, the selected item of content in an applicable one of said at least one security scheme.

10. The computer-readable medium according to claim 9, causing the computer to further execute receiving cancellation of said request for the item of content.

11. A computer-readable medium storing a program for an information processing apparatus connectable to a user device over a network, said program causing a computer to execute:

receiving at least one identification of at least one available security scheme from said user device and receiving a request for a content list, transmitting, in response to receiving the request for a content list, a list of items of content that can be transmitted in said at least one security scheme in accordance with a license policy, and in response to a request for an item of content selected from said list of items of content, transmitting the selected item of content in an applicable one of said at least one available security scheme.

12. A computer-readable medium storing a program for an information processing apparatus connectable to a content source over a network, said program causing a computer to execute:

transmitting at least one identification of at least one security scheme available for reception and reproduction of content and transmitting a request for a content list, receiving, in response to the request for a content list, a list of items of content which can be transmitted in said at least one security scheme in accordance with a license policy, and transmitting a request for an item of content selected from said list of items of content.

13. A computer-readable medium storing a program for a user device connectable to a content source over a network, said program causing the user device to execute:

transmitting at least one identification of at least one security scheme available for reception and reproduction of content and transmitting a request for a content list, receiving, in response to the request for a content list, a list of items of content which can be transmitted in said at least one available security scheme in accordance with a license policy, and transmitting a request for an item of content selected from said list of items of content.

14. A method for transmitting an item of content in an information processing apparatus connectable to a user device over a network, said method comprising:

transmitting, in response to reception of at least one identification of at least one available security scheme and of a request for a content list, a list of items of content that can be transmitted in said at least one security scheme in accordance with a license policy and that can be received by said user device and reproduced in said at least one security scheme; and transmitting, in response to a request for a item of content selected from said list of items of content, the selected item of content in an applicable one of said at least one security scheme.

15. A method for transmitting an item of content in an information processing apparatus connectable to a user device over a network, said method comprising:

receiving at least one identification of at least one available security scheme from said user device and receiving a request for content list, transmitting, in response to receiving the request for a content list, a list of items of content that can be transmitted in said at least one security scheme in accordance with a license policy, and in response to a request for an item of content selected from said list of items of content, transmitting the selected item of content in an applicable one of said at least one available security scheme.

16. A method for transmitting an item of content in an information processing apparatus connectable to a content source over a network, said method comprising:

transmitting at least one identification of at least one security scheme available for reception and reproduction of content and transmitting a request for a content list, receiving, in response to the request for a content list, a list of items of content which can be transmitted in said at least one security scheme in accordance with a license policy, and transmitting a request for an item of content selected from said list of items of content.

17. A method for transmitting an item of content in a content source to a user device over a network, said method comprising:

transmitting at least one identification of at least one security scheme available for reception and reproduction of content and transmitting a request for a content list, receiving, in response to the request for a content list, a list of items of content which can be transmitted in said at least one available security scheme in accordance with a license policy, and transmitting a request for an item of content selected from said list of items of content.

* * * * *

UNITED STATES PATENT AND TRADEMARK OFFICE
CERTIFICATE OF CORRECTION

PATENT NO. : 7,873,990 B2
APPLICATION NO. : 11/826973
DATED : January 18, 2011
INVENTOR(S) : Toshihiro Sonoda et al.

It is certified that error appears in the above-identified patent and that said Letters Patent is hereby corrected as shown below:

Column 11, Line 62, In Claim 7, after "list" insert --,--.

Column 14, Line 13, In Claim 17, delete "an a" and insert --a--, therefor.

Signed and Sealed this
Twenty-sixth Day of April, 2011

David J. Kappos
*Director of the United States Patent and Trademark Office*